United States Patent
Ruan et al.

(10) Patent No.: US 8,606,256 B2
(45) Date of Patent: Dec. 10, 2013

(54) DTMF SIGNALLING BETWEEN MOBILE AND SERVER

(71) Applicant: Research In Motion Limited, Waterloo (CA)

(72) Inventors: Zhigang Ruan, Waterloo (CA); Ximing Zeng, Wateloo (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 13/682,791

(22) Filed: Nov. 21, 2012

(65) Prior Publication Data

US 2013/0079043 A1    Mar. 28, 2013

Related U.S. Application Data

(62) Division of application No. 12/693,055, filed on Jan. 25, 2010, now Pat. No. 8,346,235.

(51) Int. Cl.
*H04M 3/00* (2006.01)

(52) U.S. Cl.
USPC ........ 455/419; 455/555; 455/703; 379/88.24; 379/93.18; 379/283; 379/142.18

(58) Field of Classification Search
USPC ............... 455/418, 419, 703, 555; 379/88.24, 379/93.18, 283, 142.18
See application file for complete search history.

(56) References Cited

U.S. PATENT DOCUMENTS

| | | | |
|---|---|---|---|
| 5,140,627 A * | 8/1992 | Dahlin .......................... | 455/436 |
| 5,881,133 A | 3/1999 | Ryan, Jr. et al. | |
| 6,035,179 A * | 3/2000 | Virtanen ...................... | 455/63.1 |
| 6,151,514 A * | 11/2000 | Cheng et al. .................. | 455/564 |
| 6,226,369 B1 | 5/2001 | Lim et al. | |
| 6,556,663 B2 * | 4/2003 | Danner et al. ............... | 379/67.1 |
| 7,062,033 B2 | 6/2006 | Suzuki et al. | |
| 2005/0185579 A1 | 8/2005 | Jung | |
| 2009/0175389 A1 | 7/2009 | Huang et al. | |

FOREIGN PATENT DOCUMENTS

DE        4337593 A1    5/1995

OTHER PUBLICATIONS

Partial European Patent Office Search Report, Opinion, and Communication dated Aug. 11, 2010 in relation to European Patent Application No. 10151597.1 (5 pages).
Extended European Search Report issued Nov. 5, 2010 in relation to European Patent Application No. 10151597.1 (11 pages).
Extended European Search Report issued Feb. 24, 2011 in relation to European Patent Application No. 11151182.0 (6 pages).

* cited by examiner

*Primary Examiner* — Vladimir Magloire

(57) ABSTRACT

In a method of processing an incoming sequence of one or more DTMF tones at a mobile device, the sequence is decoded to thereby identify any encoded message. Where the decoding does not identify a message, at least applying an error correction algorithm to the sequence to identify a message. Where the algorithm fails to correct the sequence, the sequence is compared to messages currently expected by the mobile device. If a message is not identified, a negative acknowledgement message may be sent. At a server, upon receipt of a negative acknowledgement message, it is determined if a message was sent to the mobile device in a previous pre-determined time window. If so, the message is re-sent. The server repeatedly sends certain messages to a mobile device until an acknowledgement message indicating receipt of the message by the mobile device is received.

13 Claims, 16 Drawing Sheets

900—

| In-call feature control messages from device to server | DTMF Sequence | |
|---|---|---|
| HOLD_CALL | C3C | ~902 |
| RESUME_CALL | C4C | ~904 |
| SECOND_CALL_PLUS_DN | C6C | ~906 |
| CANCEL | C12C | ~908 |
| ACCEPT_CALL | C81C | ~910 |
| ACCEPT_CALL_AND_DROP | C82C | ~912 |
| DISCONNECT_CALL | C25C | ~914 |
| ATTND_TRANSFER_START_PLUS_DN | C9C | ~916 |
| ATTND_TRANSFER_START_WITH_CALLER_ID_RESTRICTION_PLUS_DN | C7C | ~918 |
| COMPLETE_ATTND_TRANSFER | C17C | ~920 |
| UTRANSFER_PLUS_DN | C15C | ~922 |
| CANCEL_TRANSFER | C00C | ~924 |
| SWAP_CALLS | C13C | ~926 |
| MOVE_TO_DESK | C16C | ~928 |
| MOVE_TO_NUMBER | C46C | ~930 |
| CANCEL_MOVE | C27C | ~932 |

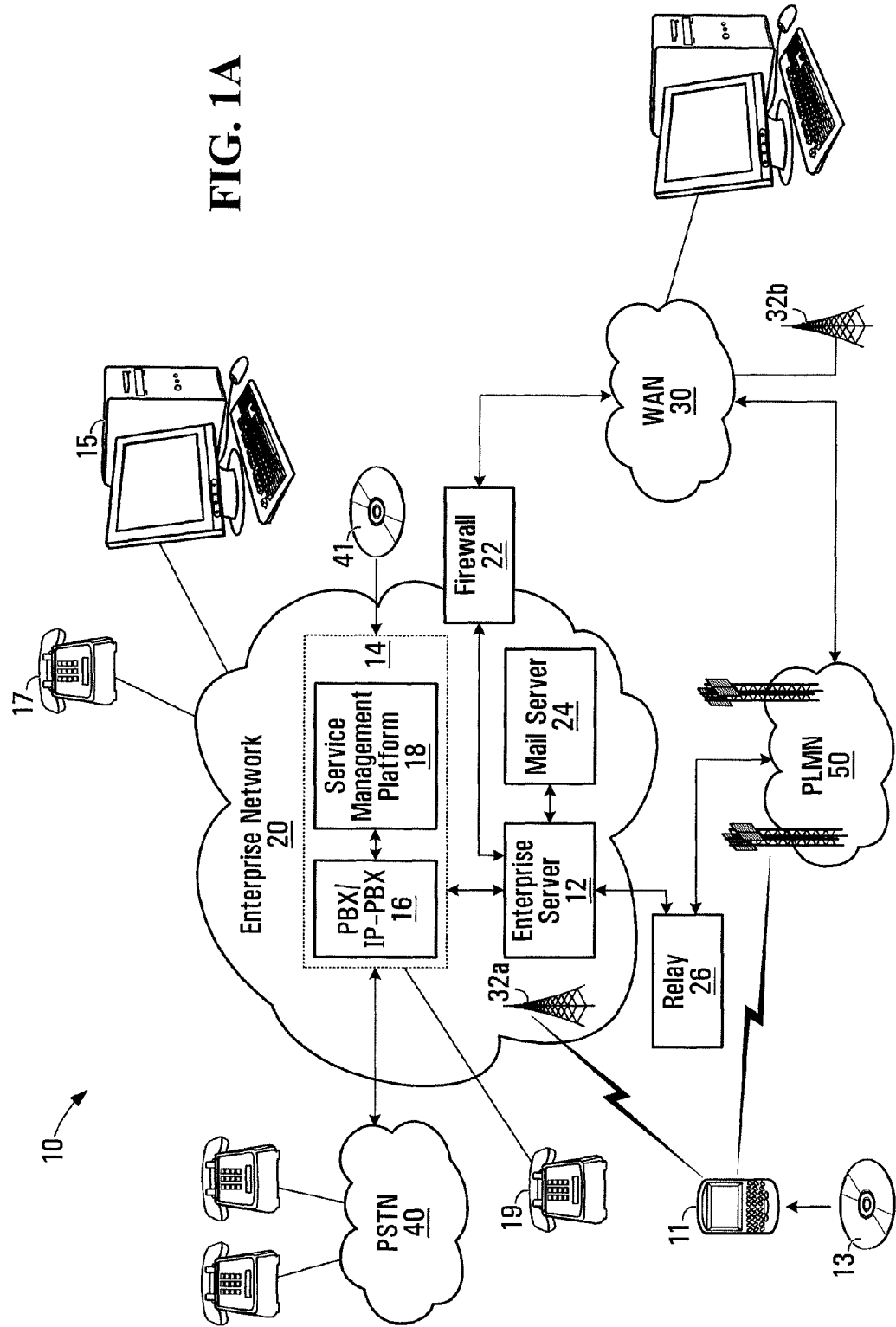

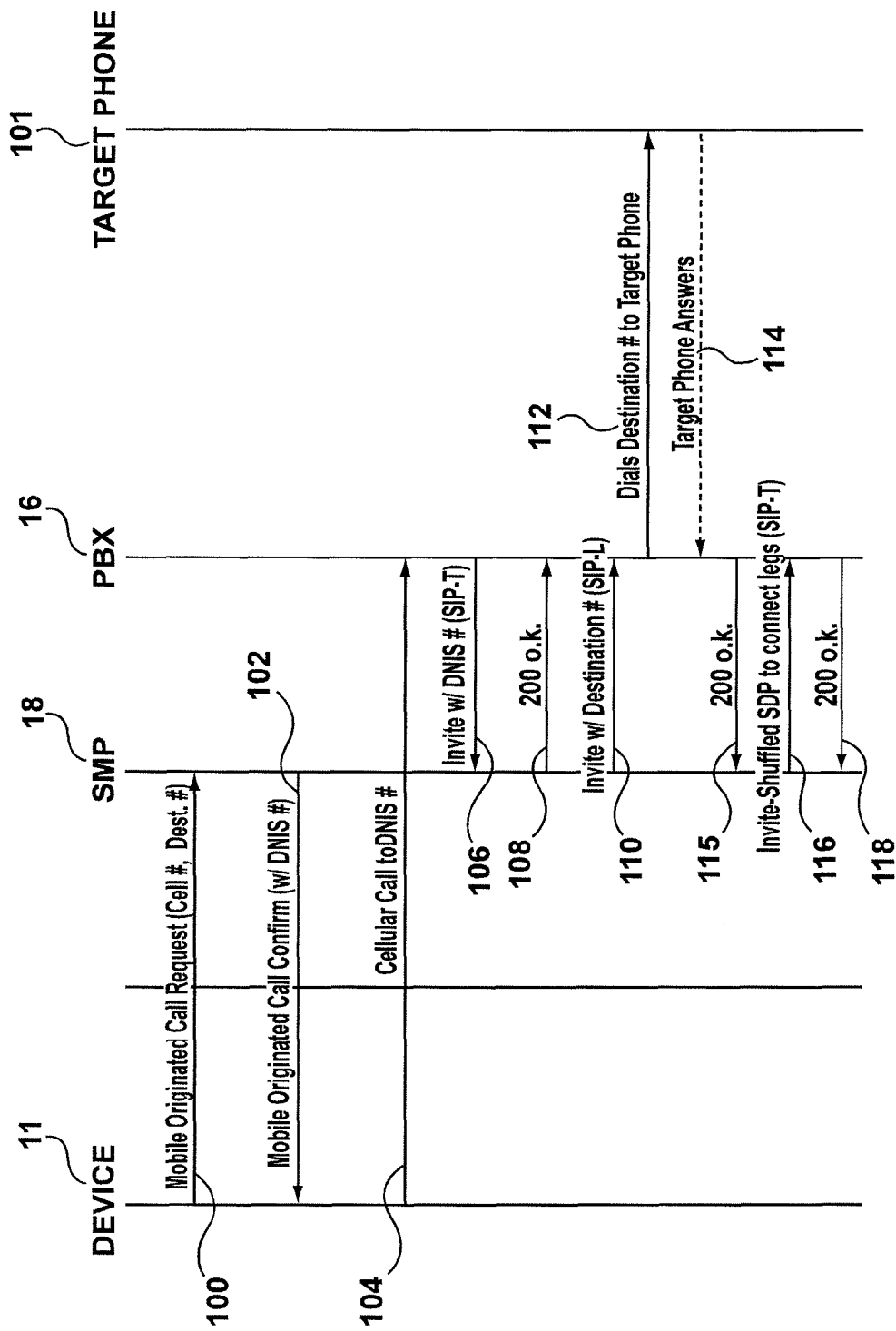

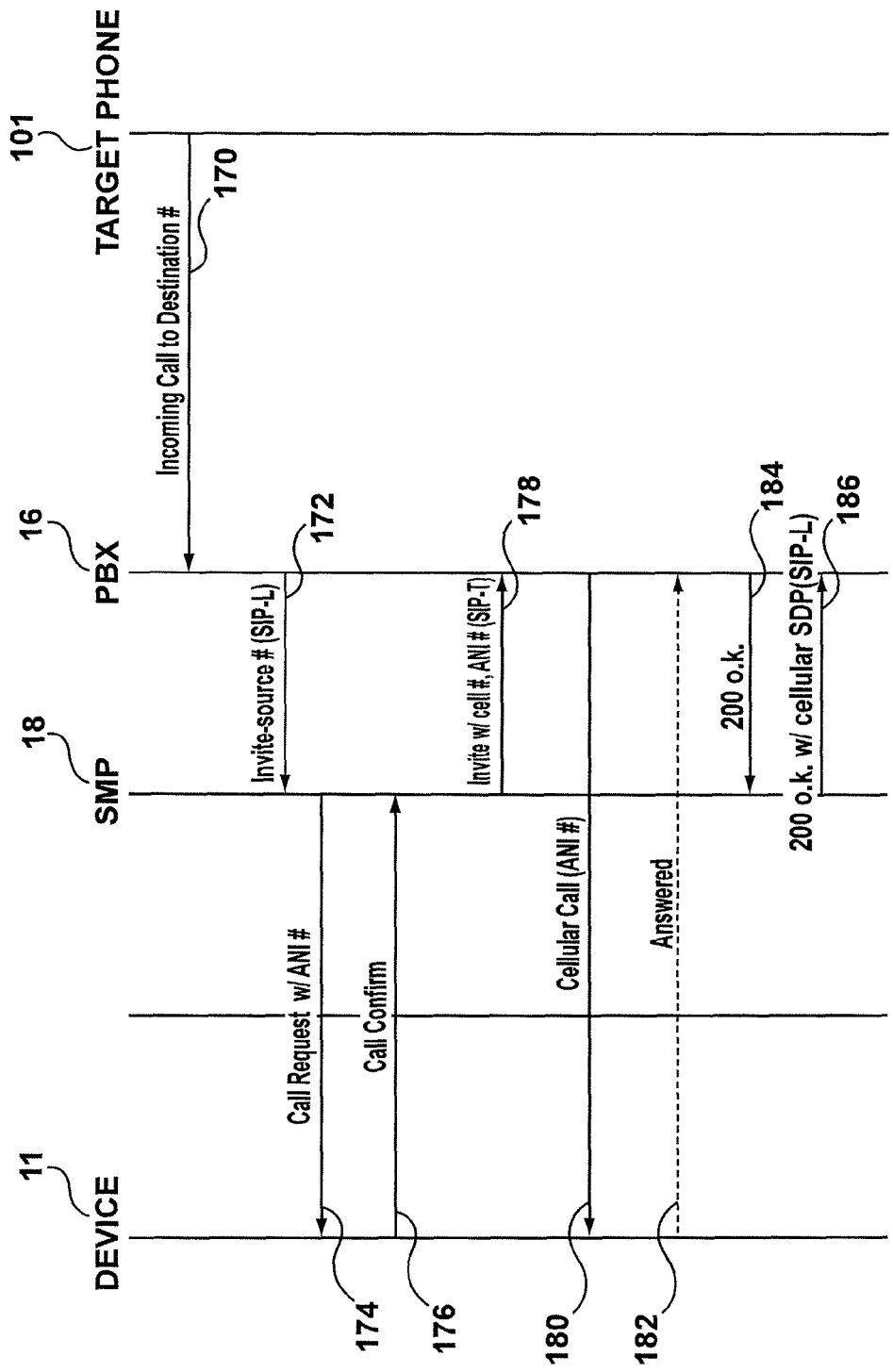

| In-call feature control messages from device to server | DTMF Sequence | |
|---|---|---|
| HOLD_CALL | C3C | ~902 |
| RESUME_CALL | C4C | ~904 |
| SECOND_CALL_PLUS_DN | C6C | ~906 |
| CANCEL | C12C | ~908 |
| ACCEPT_CALL | C81C | ~910 |
| ACCEPT_CALL_AND_DROP | C82C | ~912 |
| DISCONNECT_CALL | C25C | ~914 |
| ATTND_TRANSFER_START_PLUS_DN | C9C | ~916 |
| ATTND_TRANSFER_START_WITH_CALLER_ID_RESTRICTION_PLUS_DN | C7C | ~918 |
| COMPLETE_ATTND_TRANSFER | C17C | ~920 |
| UTRANSFER_PLUS_DN | C15C | ~922 |
| CANCEL_TRANSFER | C00C | ~924 |
| SWAP_CALLS | C13C | ~926 |
| MOVE_TO_DESK | C16C | ~928 |
| MOVE_TO_NUMBER | C46C | ~930 |
| CANCEL_MOVE | C27C | ~932 |

| In-call feature control messages from server to device | DTMF Sequence | ACK | |
|---|---|---|---|
| TARGET_RINGING | *C | 0 | ~1002 |
| TARGET_ALERTING | 1C | 0 | ~1004 |
| TARGET_ANSWERED | B | 1 | ~1006 |
| CALL_FAILED | 22C | 0 | ~1008 |
| TARGET_NOT_FOUND | 21C | 0 | ~1010 |
| TARGET_NOT_AVAILABLE | 23C | 0 | ~1012 |
| CALL_WAITING_PLUS_DN | 77C | 0 | ~1014 |
| UPDATE_CALLER_ID_PLUS_DN | 11C | 0 | ~1016 |
| CALL_HELD | 31C | 0 | ~1018 |
| CALL_HELD_FAILED | 32C | 0 | ~1020 |
| CALL_RESUMED | 20C | 0 | ~1022 |
| CALL_RESUMED_FAILED | 34C | 0 | ~1024 |
| SWAP_COMPLETED | 14C | 0 | ~1026 |
| ATTND_TRANSFER_SUCCESS | 33C | 0 | ~1028 |
| MOVE_COMPLETED | 41C | 0 | ~1030 |
| MOVE_FAILED | 42C | 0 | ~1032 |
| CALL_DISCONNECTED | 88C | 0 | ~1034 |
| SECOND_CALL_DISCONNECTED | 99C | 0 | ~1036 |

FIG. 9

DTMF SIGNALLING BETWEEN MOBILE AND SERVER

CROSS-REFERENCE TO RELATED APPLICATION

This application is a divisional of U.S. application Ser. No. 12/693,055 filed Jan. 25, 2010, the contents of which are incorporated herein by reference.

FIELD

The present application relates to DTMF signaling between mobile devices and a server.

BACKGROUND

Many cellular devices today are capable of processing both voice calls and internet/computer data. These devices are commonly referred to as "smartphones". With the advent of Voice-over-IP (VoIP) technology, it has become possible to deliver voice calls over IP networks or over a combination of IP networks and the public-switched telephone network (PSTN) rather than solely over the PSTN, as was conventional.

In some systems, voice call services are provided via connection between mobile devices to an enterprise server. These systems may include a suite of call setup features and in-call features, such as those accessible to a PBX-connected desk phone. These features may be implemented by way of a signaling protocol between the mobile devices and the server. For example, a request to invoke a particular feature by a mobile device may be encoded into a signal transmitted by the mobile device to the server. Typically, signals transmitted between the mobile devices and a server are transmitted over the data channel. However, the data channel may sometimes be unavailable for various reasons.

Therefore, signals transmitted between the mobile devices and a server may be transmitted over the voice channel in DTMF. However DTMF is not a reliable and efficient data transmission mechanism in general, so there is a need for improved signaling between mobile devices and the voice mobility server.

BRIEF DESCRIPTION OF THE DRAWINGS

Reference will now be made, by way of example, to the accompanying drawings which show example embodiments of the present application, and in which:

FIG. 1A shows, in block diagram form, an example system for managing enterprise-related mobile calls, including an enterprise communications platform;

FIG. 6A is a signaling diagram generally indicating how mobile-originated, mobile-initiated calls are processed by the network of FIG. 5;

FIG. 7B is a signaling diagram generally indicating how mobile-terminated, PBX-initiated calls are processed by the network of FIG. 5;

FIG. 8 is a table of exemplary call control or call processing messages sent by mobiles to a server over a voice channel in the enterprise communications platform;

FIG. 9 is a table of exemplary call control or call processing messages sent by a server in the enterprise communications platform to mobiles over a voice channel in the enterprise communications platform;

Similar reference numerals may have been used in different figures to denote similar components.

DESCRIPTION OF EXAMPLE EMBODIMENTS

Figure 1B:
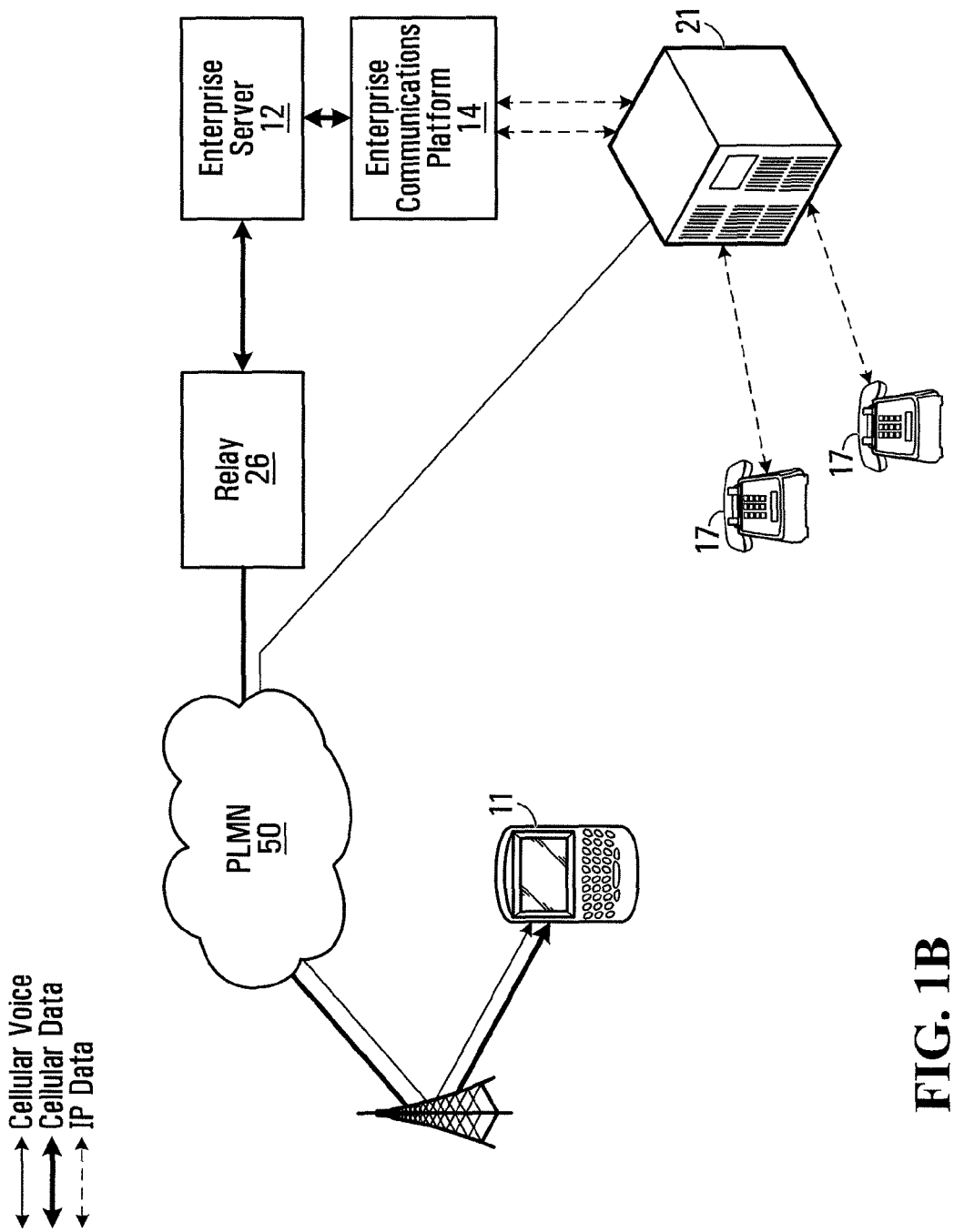
FIG. 1B show, in block diagram form, another view of the example system of FIG. 1.

In one aspect, the present application provides a method of processing an incoming sequence of one or more DTMF tones at a mobile communications device. The method includes decoding the sequence to identify any message encoded by the sequence; where the decoding does not identify a message encoded by a given incoming sequence, at least applying an error correction algorithm to the incoming sequence to identify a message from the given incoming sequence. The method further includes where the error correction algorithm fails to correct, comparing the given incoming sequence to messages currently expected by the mobile communications device.

In another aspect, the present application provides a method at a server of communicating with a mobile communications device. The method includes upon receipt of an indicator indicating receipt by the mobile communications device of an unrecognized message, determining if a first message was sent to the mobile communications device in a previous pre-determined window of time; and re-sending the first message if the determining determines that the second message was sent to the mobile communications device in the previous pre-determined window of time.

In yet another aspect, the present application provides a method of voice call handling at a mobile communications device. The method includes receiving over a voice connection at least one received tone, where each of the at least one received tone comprises a dual tone multi-frequency ("DTMF") signal; decoding the at least one received tone to identify a message; and where the message is a call answered message, sending at least one reply tone, the at least one reply tone encoding an acknowledgement message.

In yet another aspect, the present application provides a method of voice call handling at a mobile communications device. The method includes receiving a signal from a server; extracting a sequence of DTMF tones from the received signal; and identifying a message mapped by the sequence, if the sequence maps uniquely to a message. The method further includes where the sequence does not map to any message, applying an error correction algorithm to the sequence to produce a corrected sequence, and identifying a message mapped by the corrected sequence. The mobile sends a "negative acknowledgement" message to the server if no message is identified.

Mobile devices implementing, and computer readable media containing instructions which when executed implement, the disclosed methods are provided.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1A, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to setup, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
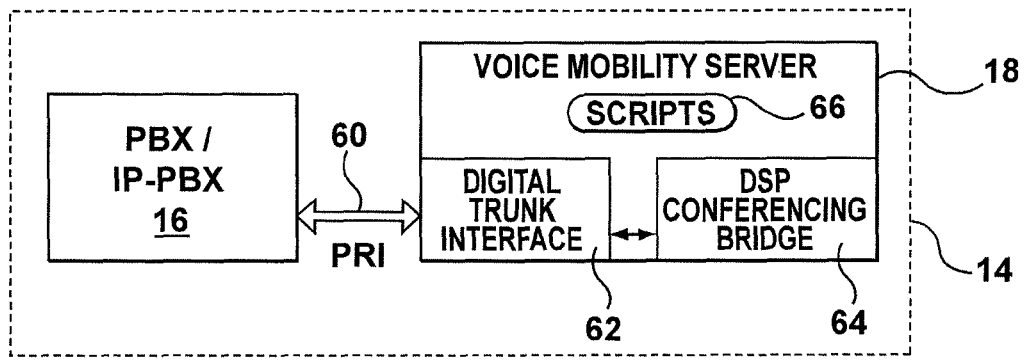
FIG. 2 shows, in block diagram form, further details of an embodiment of the enterprise communications platform.
Figure 3:
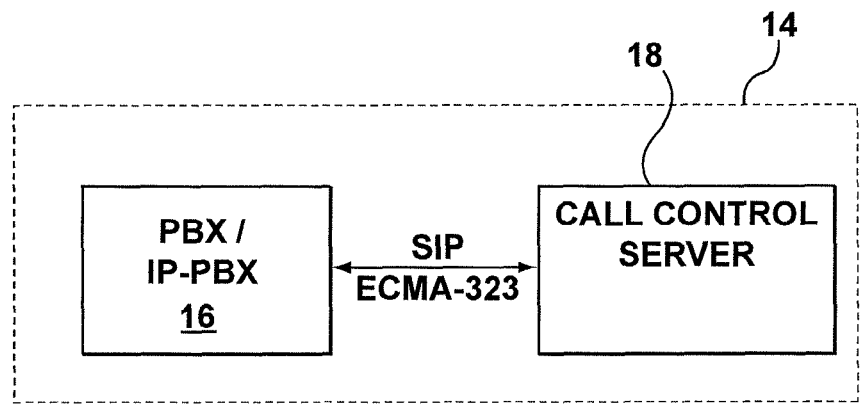
FIG. 3 shows another embodiment of the enterprise communications platform.
Figure 4:
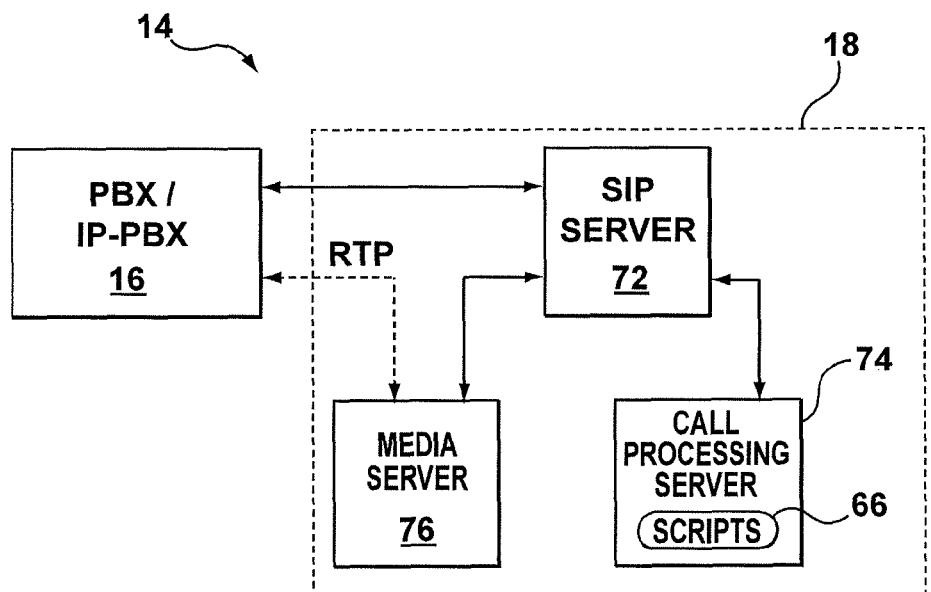
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
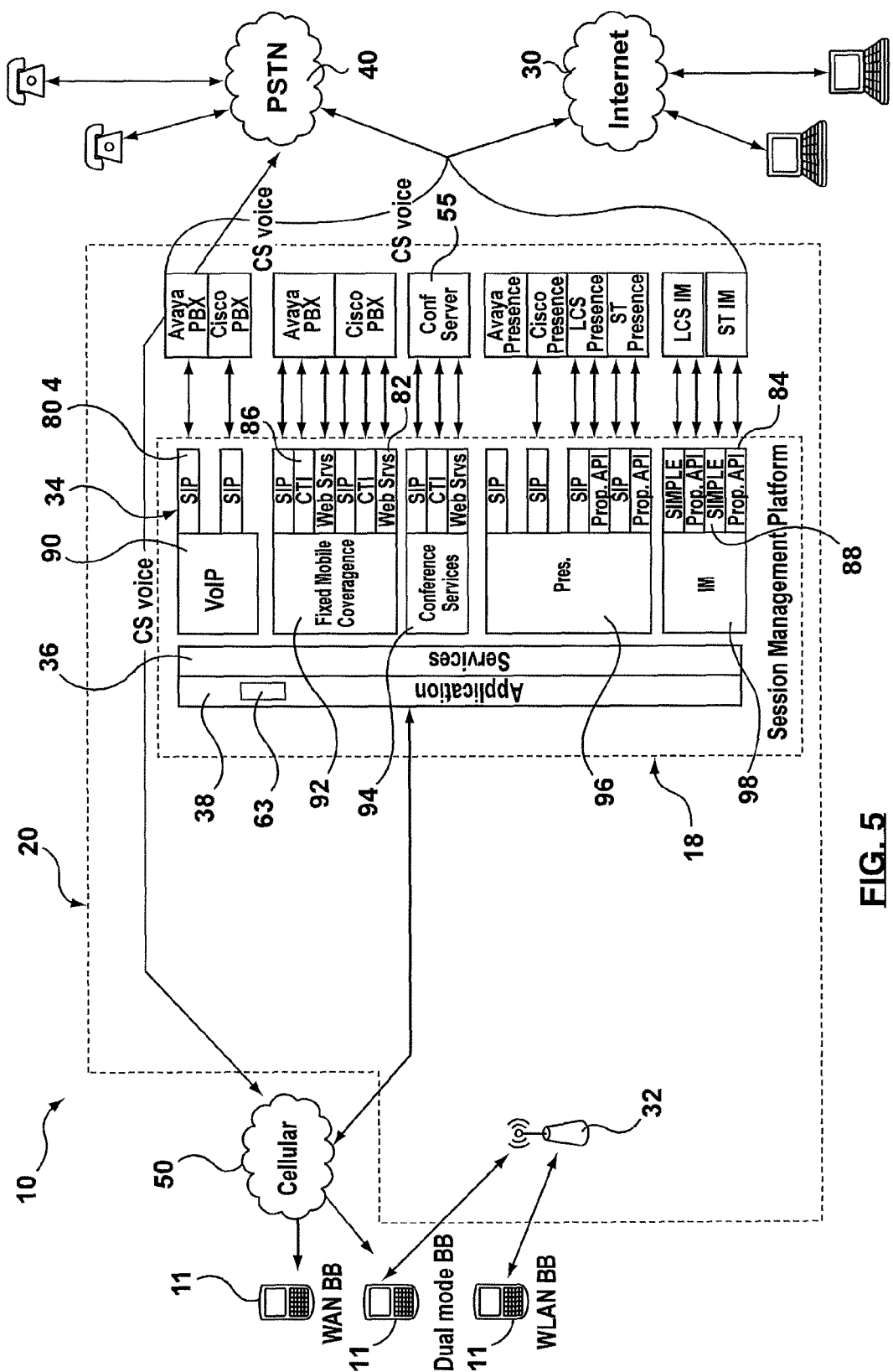
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
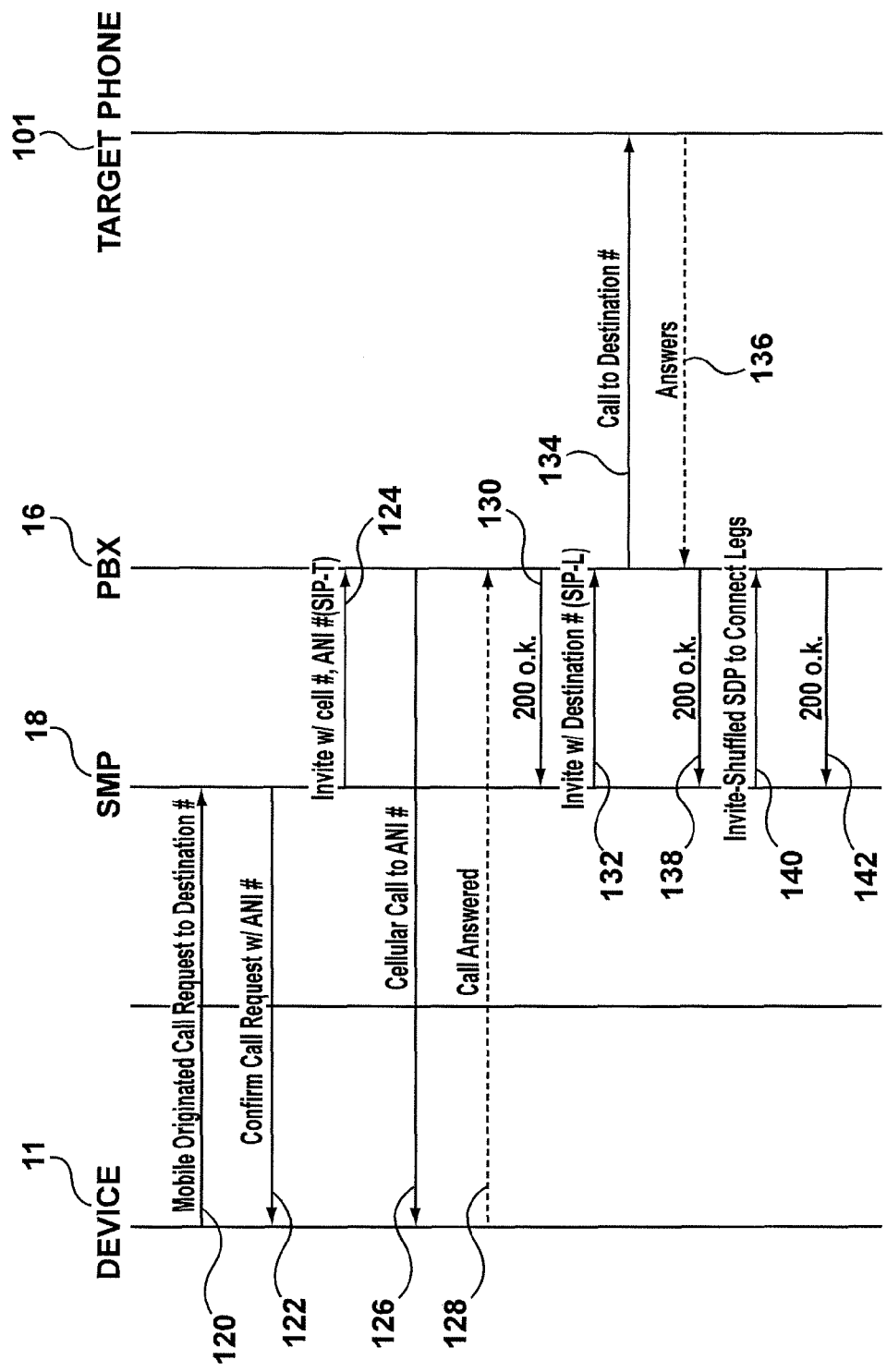
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
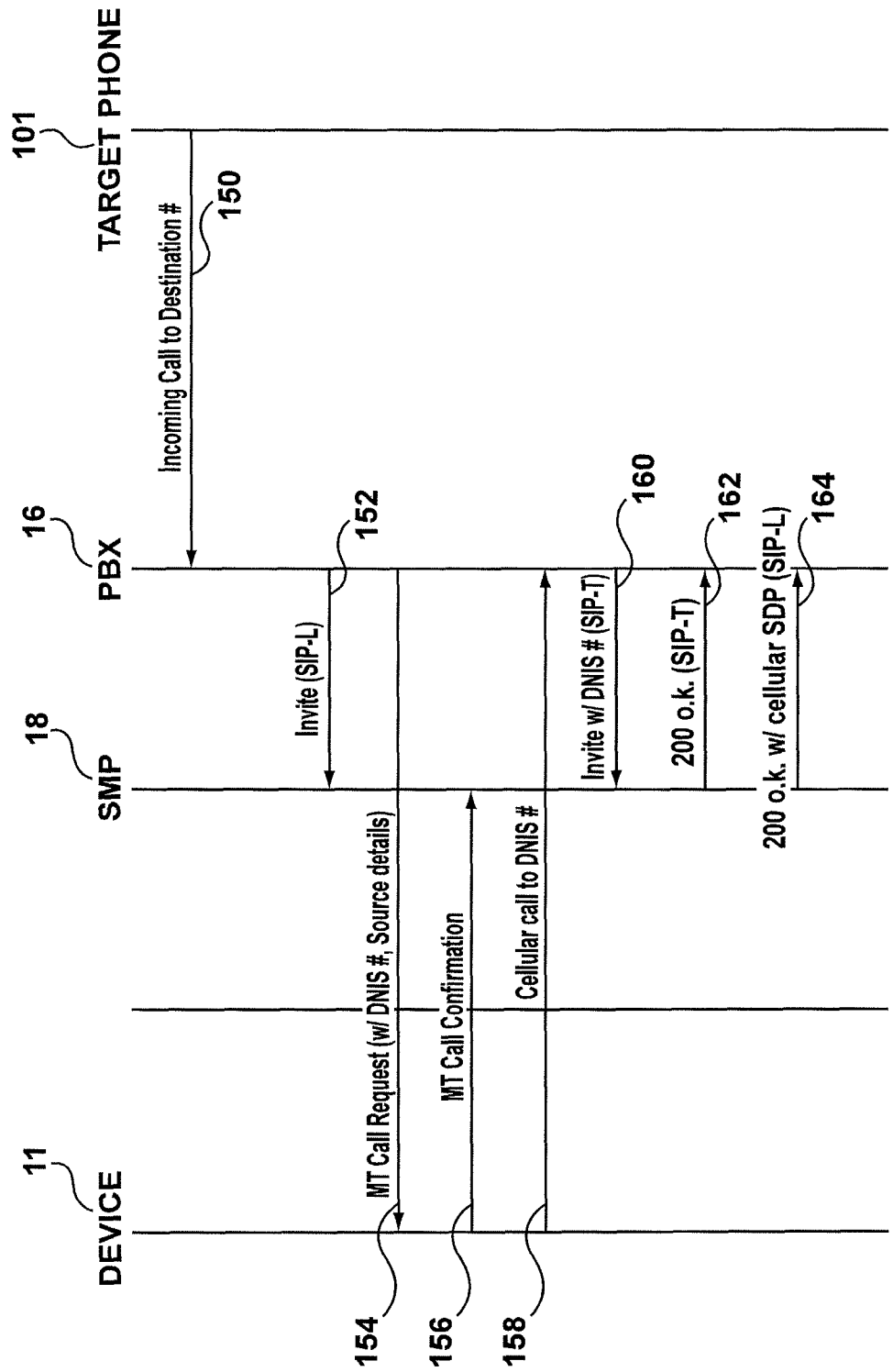
FIG. 7A is a signaling diagram generally indicating how mobile-terminated, mobile-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

FIG. 1B presents an alternate view of the system of FIG. 1A showing three types of data flow: cellular voice data, cellular data and IP data, between selected components of system 10. Generally, the voice channel carries voice call data and may therefore accordingly be optimized for voice data, whereas the data channel carries computer data. Mobile devices 11 may send and receive data over PLMN 50 via the cellular data channel and/or the data channel. Relay 26, enterprise server 12 and enterprise communications platform 14 also may send and receive computer data, e.g. from mobile device 11 over the data channel (via PLMN 50). As explained previously, voice calls may be carried in the form of IP data (VoIP) over the cellular data channel and/or within the enterprise network 20. Cellular voice data incoming from PLMN 50 to the enterprise may be converted into IP data by a call manager 21 such as a Cisco Unified Communications Manager. Call manager 21 may convert cellular voice data into corresponding IP data for sending to one or more digital telephone sets 17. Furthermore, cellular data coming into the enterprise via the relay 26—enterprise server 12—enterprise communications platform 14 route may be sent to one or more digital telephone sets 17 as IP data. In the exemplary embodiment, enterprise communications platform 14 is generally described as the server to mobile devices 11. Therefore, in the following disclosure, enterprise communications platform 14 may be generally referred to as server 14.

As explained previously, with reference to FIG. 1A, the enterprise communications platform 14 may provide mobile voice services to mobile devices 11 so as to allow a given mobile device 11 to act in the same manner as a PBX/IP-PBX 16—connected desk phone (e.g. telephone set 17). Specifically, the enterprise communications platform 14 may provide a suite of call setup features and in-call features much like the features available to a PBX/IP-PBX 16—connected desk phone. These features may be implemented in a message exchange protocol between mobile devices 11 and server 14. Specifically, and as will be more fully explained below, a user-originated request for a particular feature may initiate a message exchange sequence between the user's mobile device 11 and the server 14. These messages may be encoded by modulating a signal in accordance with a data modulation technique, as will be understood by those of ordinary skill in the art. The resulting data signal may then be transmitted by the mobile device 11 to the server 14, and vice versa via PSTN 40, PLMN 50 or WAN 30 or a combination thereof.

In an exemplary embodiment of system 10, dual-tone multi-frequency (DTMF) signaling is used in the exemplary message exchange protocol for message exchange between mobile devices 11 and server 14. As may be appreciated by a person of ordinary skill in the art, DTMF signaling operates as follows: each symbol in the set {0-9, *, #, A-D} is laid out in a 4-by-4 matrix, and a particular frequency associated with each symbol in the set. The DTMF matrix is provided below:

|         | 1209 Hz | 1336 Hz | 1477 Hz | 1633 Hz |
|---------|---------|---------|---------|---------|
| 697 Hz  | 1       | 2       | 3       | A       |
| 770 Hz  | 4       | 5       | 6       | B       |
| 852 Hz  | 7       | 8       | 9       | C       |
| 941 Hz  | *       | 0       | #       | D       |

Specifically, each symbol in the DTMF symbol set is represented by a combination of two frequencies. For example, to represent the symbol "1", a 697 Hz sinusoidal wave is combined with a 1209 Hz sinusoidal wave. The resulting combined wave may be audible as a "DTMF tone". To transmit the symbol "1", the combined wave, or "DTMF tone" associated with the symbol "1" may be transmitted to the intended recipient over the voice channel. The recipient may then decode the received wave, or "DTMF tone" to determine which symbol was sent. In this disclosure, the terms "DTMF symbol" and "DTMF tone" may be used interchangeably. However, in certain contexts the term "DTMF symbol" may be used to specifically refer to one of DTMF symbols {0-9, *, #, A-D}, and the term "DTMF tone" to refer to the audible representation of a particular DTMF symbol.

The universe of messages in the exemplary exchange protocol may be stored in two tables. The first table may be a device-to-server message table storing the universe of messages sent by a mobile device 11 to server 14, i.e. possible messages mobile device 11 could send to server 14. The second table may be a server-to-device message table storing the universe of message sent by server 14 to mobile devices 11, i.e. possible messages server 14 could send to device 11.

Table 900 (FIG. 8), an exemplary device-to-server message table, contains an exemplary list of sixteen possible in-call feature control messages that may be sent from a mobile device 11 to the server 14 during an active voice call. Table 900 may be stored in a memory (not shown) of server 14. Each of rows 902, 904, 906, 908, 910, 912, 914, 916, 918, 920, 922, 924, 926, 928, 930 and 932 lists an exemplary mapping of control messages to DTMF sequences. For example, row 905 specifies that the HOLD_CALL control message is mapped to the DTMF sequence "C3C". The HOLD_CALL message, may, for example, indicate that a user wishes to put an active voice call on hold. To send a HOLD_CALL message to server 14, mobile device 11 may send a sequence of three DTMF tones ("DTMF tone sequence"), each associated with the DTMF symbols "C", "3" and "C" respectively, to server 14 in a conventional manner. Upon receipt, server 14 may decode the received DTMF tone sequence, in a conventional manner, to determine that the symbols "C", "3" and "C" were sent by the mobile device 11. Further, server 14 may identify that the symbol sequence "C3C" is mapped to the HOLD_CALL message, and may thereby determine that that particular mobile device 11 (or more accurately, the user of that particular mobile device 11) is requesting that the active voice call be put on hold. Server 14 may then take further action as appropriate.

Table 1000 (FIG. 9), an exemplary server-to-device message table, contains an exemplary list of nineteen possible in-call feature control messages that may be sent from server 14 to a mobile device 11 during an active voice call. Table 1000 may be stored in a memory (not shown) of mobile device 11. Each of rows 1002, 1004, 1006, 1008, 1010, 1012, 1014, 1016, 1018, 1020, 1022, 1024, 1026, 1028, 1030, 1032, 1034 and 1036 specifies an exemplary mapping of control messages to DTMF sequences. For example, as specified in row 1002, the TARGET_RINGING control message is mapped to the DTMF sequence "*C". This message may indicate, for example, that the called party device is ringing. To send the TARGET_RINGING message to a mobile device 11, server 14 may send the "*" tone followed by the "C" tone to the mobile device 11 in sequence in a conventional manner. Upon receipt, the mobile device 11 may decode the received DTMF tone sequence, in a conventional manner, to determine that the symbols "*" and "C" were sent by server 14. Mobile device 11 may further identify that the symbol sequence "*C" is mapped to the TARGET_RINGING message, and may take further action as appropriate.

Figure 10:
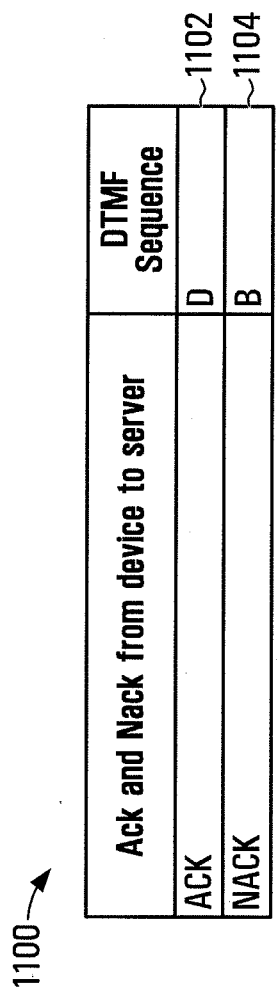
FIG. 10 is table of an exemplary acknowledge and an exemplary negative acknowledgement message sent by mobiles to the server over a voice channel in the enterprise communications platform.

Moreover, an indicator may be kept in server-to-device message table 1000 indicating that receipt of a particular message should be acknowledged. In particular, a value of "1" in the column entitled "ACK" for a particular message may indicate that receipt of that particular message should be acknowledged. Thus, the value of "1" in the ACK column of row 1006 indicates that receipt of a TARGET_ANSWERED message by mobile device 11 should be acknowledged (by sending DTMF tone "D" (FIG. 10) to server 14, as further described below). Conversely, the values of "0" in the ACK column for all other rows of table 1000 indicates that receipt of any one of the other messages need not be acknowledged by mobile device 11.

Table 1100 (FIG. 10) lists two special non-control messages that may be sent by a mobile device 11 to server 14. Table 1100 may be stored in the memory of mobile device 11. Specifically, table 1100 specifies that an ACK ("acknowledge") message is mapped to a single DTMF tone, "D", and a NACK ("negative acknowledgement") message is mapped to a single DTMF tone, "B". The functions of the ACK and NACK messages will become apparent below.

It may be noted that each exemplary control message in tables 900 and 1000 consists of a sequence of two to four DTMF tones. The mapping of each control message in the universe of all control messages to a particular sequence of DTMF tones may of course be arbitrary. However, as will become apparent, strategic mapping of particular sequences of DTMF tones to particular control messages, and strategic selection of particular DTMF tones in certain sequences, may be advantageous. Notably, such strategic mapping may increase the reliability of DTMF signaling between mobile devices 11 and voice mobile server 18 in system 10, as detailed below.

DTMF has traditionally been regarded as an unreliable data transmission mechanism. For example, DTMF tones can be lost or corrupted in transmission. DTMF tone detectors may sometimes detect false DTMF tones. Additionally, it takes approximately 100 ms to send a single DTMF tone, therefore DTMF is a relatively slow method of communication.

Moreover, the design of enterprise communications platform 14 further adds to the challenges of using DTMF signaling in system 10. For example, enterprise communications platform 14 is a real-time system and thus requires virtually instant communication between server 14 and a mobile device 11. Thus, keeping the number of DTMF tones sent per message to as few as possible, and limiting the number of instances of re-transmission of messages, may be desirable (because, for example, long transmission times may result in user perception of sluggish system response times). Second, since DTMF tones are transmitted over the voice channel in the exemplary embodiment and are within human-audible range, a multitude of DTMF tones may degrade user experience since a user would hear these tones in his or her mobile device earpiece. Thus, for this reason also, it may be desirable to reduce the number of DTMF tones exchanged between the mobile device 11 and server 14.

Accordingly, a method for increasing reliability of DTMF signaling between mobile device 11 and server 14 is provided, which method may minimize signaling. In overview, the method includes mapping certain control messages to DTMF tone sequences such that even if only a part of a complete DTMF tone sequence is received, e.g., due to transmission error or decoding errors, the recipient mobile device 11 may nevertheless identify the intended message. The method may further include repeated transmission by server 14 of certain very important control messages until receipt is acknowledged by an intended recipient mobile device 11. The method may further include transmission of a "negative acknowledgement" message by mobile device 11 to server 14 upon receipt of a DTMF tone sequence that it cannot identify as a recognized message.

More specifically, the exemplary embodiment includes redundantly coding certain messages so that an error correction algorithm can be applied to a received sequence of tones to recover the sequence of tones that were actually sent. For example, the CALL_DISCONNECTED (row 1036) and SECOND_CALL_DISCONNECTED (row 1038) messages listed in table 1000 (FIG. 9) map to DTMF sequences "88C" and "99C", respectively. Notably, no other control message that may be sent by server 14 to mobile device 11, as specified in table 1000, maps to "88C" and "99C", or maps to any two sequence sub-sequence of "88C" and "99C". Further, the only single signal that does not uniquely map to "88C" or "99C" is the signal "C". Thus, conveniently, even if mobile device 11 does not receive the complete sequence of tones "88C" but only receives a sub-sequence of those tones, e.g. "8", "88", "8C", it may be able to identify the received tones as the CALL_DISCONNECTED message. Similarly, if mobile device 11 receives a sub-sequence of the tones "99C", it may be able to identify the received tones as the SECOND_CALL_DISCONNECTED message.

As will be noted from tables 900 and 1000, not all messages are redundantly coded. In these instances, contextual error correction may be performed. For example, the CALL_HELD_FAILED (table 1000, row 1020) is not redundantly coded. That is, if a mobile device 11 were to receive the sequence of tones "2C", it would not necessarily be able to uniquely identify a message because the DTMF tones "2C" is a sub-sequence of DTMF tone sequences for several other messages, namely, CALL_FAILED (row 1008); TARGET_NOT_FOUND (row 1010); TARGET_NOT_AVAILABLE (row 1012); CALL_RESUME_FAILED (row 1024); and ATTND_TRANSFER_SUCCESS (row 1028). However, in this scenario, mobile device 11 may still be able to deduce what sequence of tones was actually sent by server 14 by comparing the received sequence of tones to messages currently expected by mobile device 11. For example, if mobile device 11 had previously sent a HOLD_CALL control message (table 900, row 902) to server 14, it may expect to receive in reply a CALL_HELD or CALL_HELD_FAILED message. Upon sending a particular control message to server 14, it may be determined if server 14 may be expected to reply to that message with a reply message. If so, device 11 may store a table of expected reply messages for a pre-determined time (e.g. 10 minutes—but of course other time periods could be used).

Referring to table 1000 (FIG. 9), the CALL_HELD message is mapped to the DTMF sequence "31C" and the CALL_HELD_FAILED message is mapped to the DTMF sequence "32C". Therefore, since the received sequence of tones detected by mobile device 11, "2C", is a sub-sequence of the sequence "32C" but not of the sequence "31C", it may be deduced that voice mobile server 18 actually sent the sequence "32C", thus identifying that voice mobile server 18 sent a CALL_HELD_FAILED message.

For some features, it may be desired that receipt of control messages associated with those features be assured. The TARGET_ANSWERED message (FIG. 9, table 1000, row 1006) is an example of such a message. This message may be sent by server 14 to mobile device 11 to indicate that the called party (i.e. the "target") is connected. In particular, voice mobility server 11 may be designed to refrain from sending any voice data signals originating from the called party until the calling party, i.e. mobile device 11, acknowledges receipt of the TARGET_ANSWERED message. Absent this requirement, it is possible that the initial part of the called party's conversation could be dropped because mobile device 11 is not, for example, in a proper state to receive. Consequently, and in accordance with the exemplary embodiment of the present disclosure, receipt of a TARGET_ANSWERED message should be acknowledged by the recipient (i.e., mobile device 11).

Moreover, because the TARGET_ANSWERED message is mapped to a single DTMF tone (i.e. "B"), in the event that the tone is dropped during transmission, the intended recipient mobile device 11 may have no way of knowing that server 14 had sent a message. Even further, in the event the tone is corrupted in transmission but nevertheless received by mobile device 11 (e.g. as DTMF tone "C", rather than tone "B") mobile device 11 may not be able to deduce which message was actually sent. Thus, a mechanism for ensuring proper receipt of the message is required. The ACK message may be a suitable mechanism. In exemplary table 1100 (FIG. 10), row 1102 specifies that the ACK message is mapped to DTMF sequence "D". Therefore, to send an ACK message, mobile device 11 may send the "D" DTMF tone to server 14.

In some cases, mobile device 11 may be unable to identify any recognized messages from a sequence of received DTMF tones, due to for example, errors or corruption of the DTMF tones in transmission. For example, if the "1" tone in the sequence "1C" (mapping to the TARGET_ALERTING message (Table 1000, row 1004)) was dropped in transmission from server 14 to mobile device 11, mobile device 11 may only receive the "C" tone. However, the "C" tone is a part of many other possible server to device messages (e.g. CALL_FAILED "22C" (row 1008), TARGET_NOT_FOUND "21C" (row 1010)). Thus, mobile device 11 may have no way (in the event the error correction mechanisms previously described fail to identify a message) of ascertaining what sequence of tones server 14 actually transmitted. In such instances, mobile device 11 may send a NACK ("negative acknowledgement") message to server 14. In exemplary table 1100 (FIG. 10), row 1104 specifies that the NACK message is mapped to DTMF sequence "B". Therefore, to send a NACK message, mobile device 11 may send the "B" DTMF tone to server 14.

Figure 11:
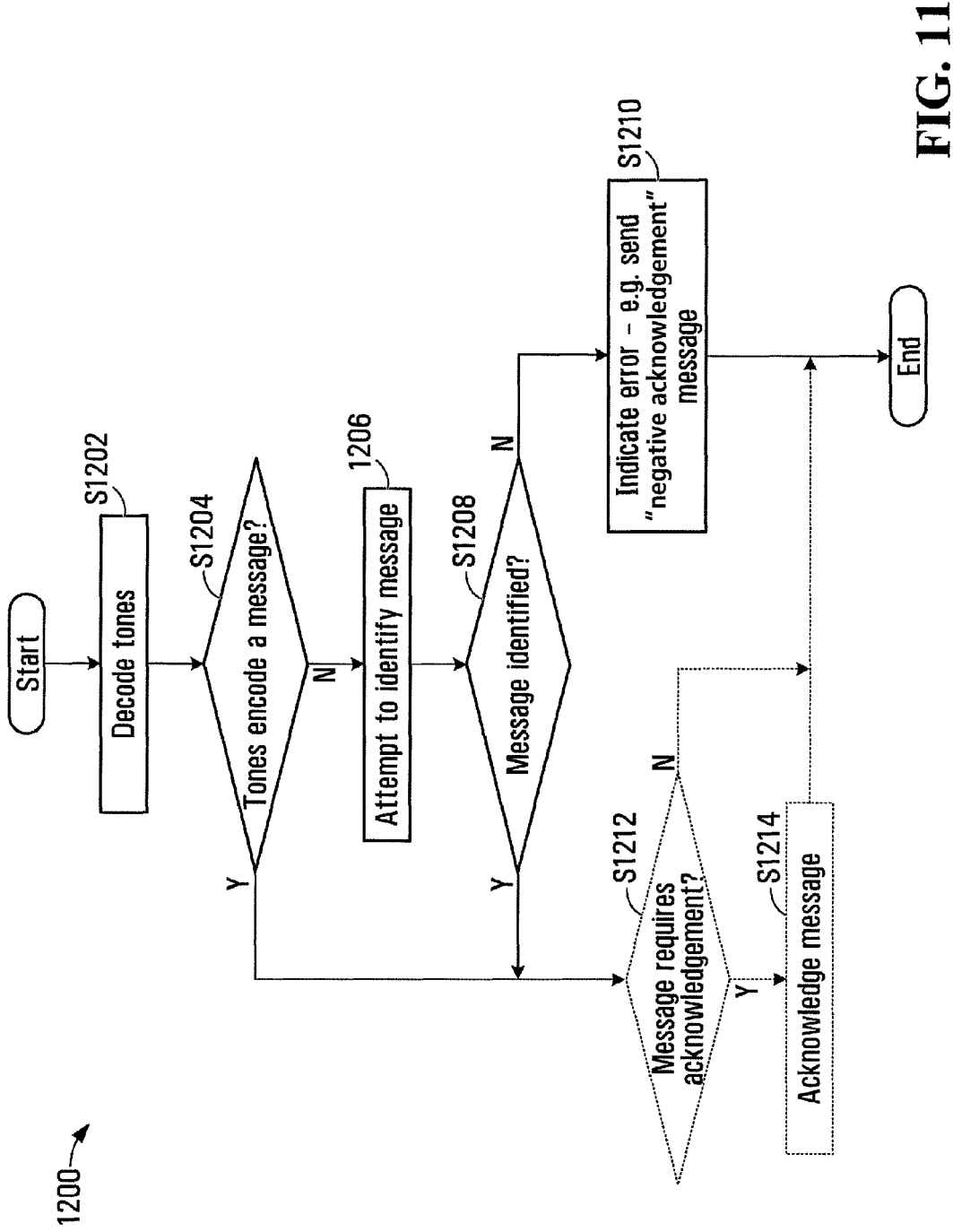
FIG. 11 is a flow diagram depicting a message receipt operation of a mobile over a voice channel in the enterprise communications platform.

In operation, and with reference to flow diagram S1200 (FIG. 11), upon receipt of a sequence of one or more DTMF tones, mobile communications device 11 may decode the sequence of tones using for example, a conventional DTMF signal decoder component of mobile device 11 (not illustrated) (S1202). Mobile device may determine whether the sequence of tones encode a message (S1204) by, for example, comparing the tones to tones listed in server-to-device message table 1000 (FIG. 9). Table 1000 may be stored in a memory of mobile device 11, as previously described.

If it is determined that the sequence of tones identify a message (the "identified message"), (i.e. the sequence of tones match a sequence of tones mapped to a particular message listed in server-to-device message table 1000), communications device 11 may subsequently determine if the identified message requires acknowledgement (S1212) by, for example, determining if the "ACK" indicator for the identified message has been set to "1" in table 1000. If the identified message requires acknowledgement, mobile device 11 may send an "ACK" message to server 14, in the manner previously described (S1214).

Figure 12:
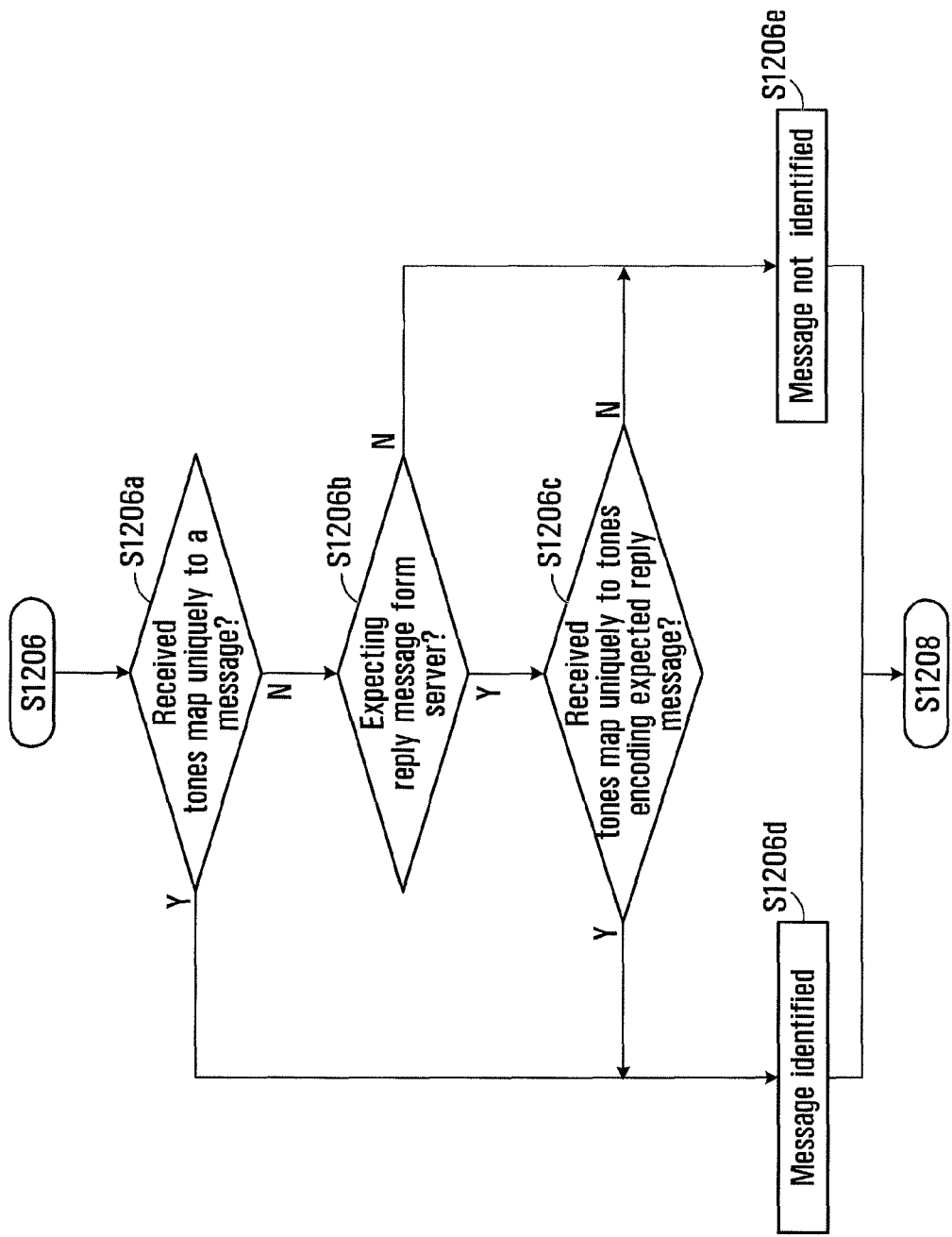
FIG. 12 is a flow diagram depicting a message identification operation a mobile, which message identification operation is a step of the message receipt operation shown in FIG. 11.

However, if no message is identified at S1204, mobile device 11 may attempt to identify a probable message (S1206) using an error correction mechanism, further described in conjunction with FIG. 12 below. If, following application of the error correction mechanism, no message is identified (S1208), mobile device may indicate an error by, for example, sending a "NACK" message to server 14 (S1210), in the manner previously described. If, following application of the error correction mechanism, a message is identified (S1208), mobile device may subsequently determine if the identified message requires acknowledgement, and if it does, acknowledge the message (S1212, S1214).

Operation of the error correction mechanism (S1206) will now be described in conjunction with FIG. 12. To identify a candidate message, mobile device 11 may determine if the received tones map uniquely to a message (i.e. if the received tones are a sub-sequence of tones mapping to a redundantly coded message, in the manner previously described) (S1206a). If it does, then the received tones may be identified as the candidate message (S1206d), and further operation of mobile device 11 may proceed on the assumption that the message actually sent by server 14 was the candidate message.

If the received tones do not map uniquely to any messages (i.e. if the received tones are a sub-sequence of more than one message), mobile device 11 may determine if it is expecting any particular reply messages from server 14. To do so mobile device 11 may examine messages stored in the expected reply message table (S1206b). If one or more candidate reply messages are currently expected (i.e. there is at least one message stored in the expected reply message table), mobile device 11 may determine if the received DTMF sequence maps uniquely to one of the candidate reply messages (S1206c), in the manner previously described. If it does, then mobile device 11 may identify the received tones as the candidate message (S1206d). Subsequent operation of mobile device 11 may proceed on the assumption that the message actually sent by server 14 was the candidate message. However, if the received tones do not uniquely map to any expected reply messages, mobile device 11 may be unable to identify the message (S1206e). Similarly, if the received tones do not map uniquely to any messages, and no reply messages are currently expected from server 14 (S1206b), then mobile device 11 may be unable to identify any message (S1206e) (i.e. may be unable to map the received tone sequence to any messages).

Figure 13B:
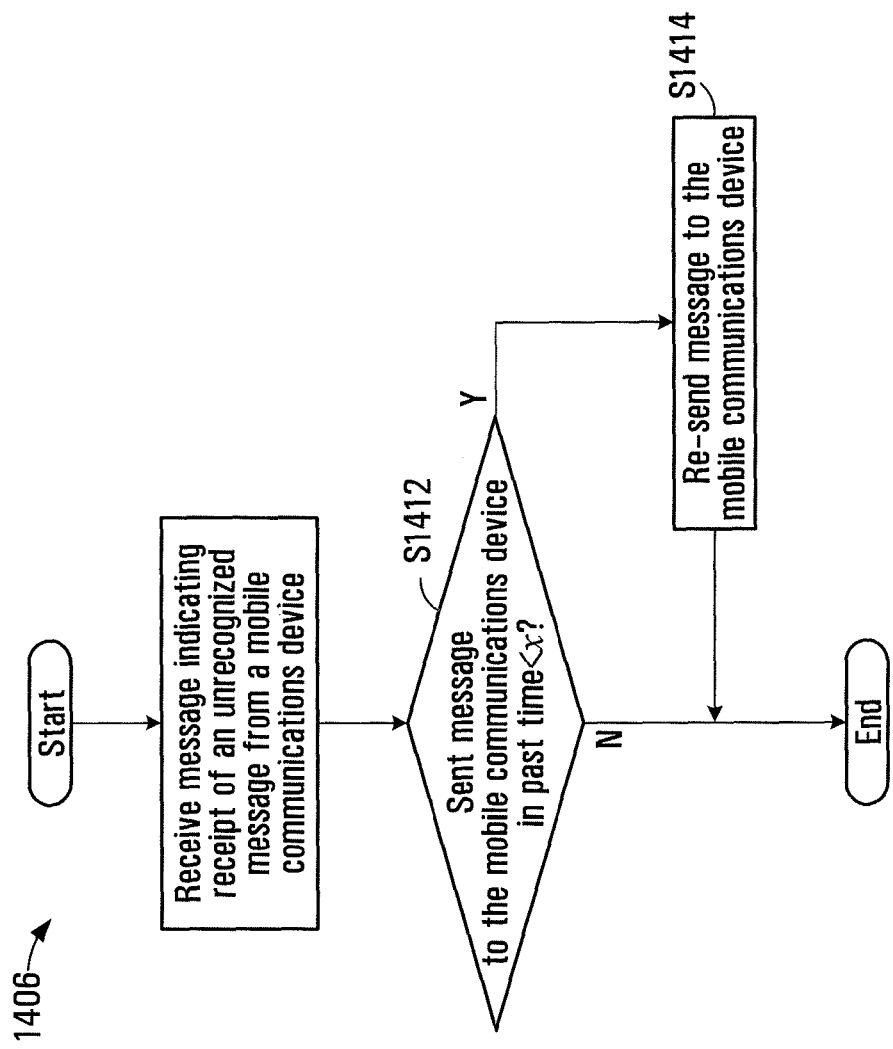
FIGS. 13A, 13B and 13C are flow diagrams depicting message sending operations of the server over a voice channel in the enterprise communications platform.
Figure 13A:
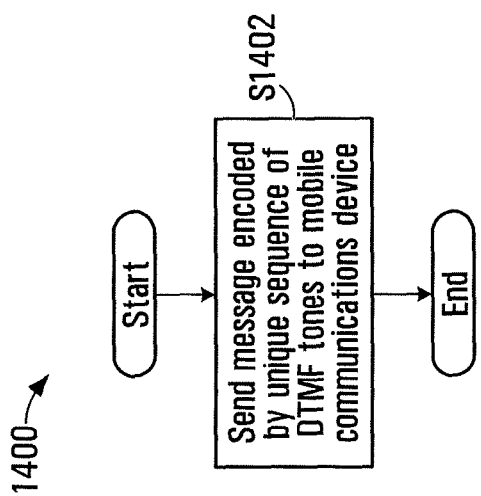
Figure 13C:
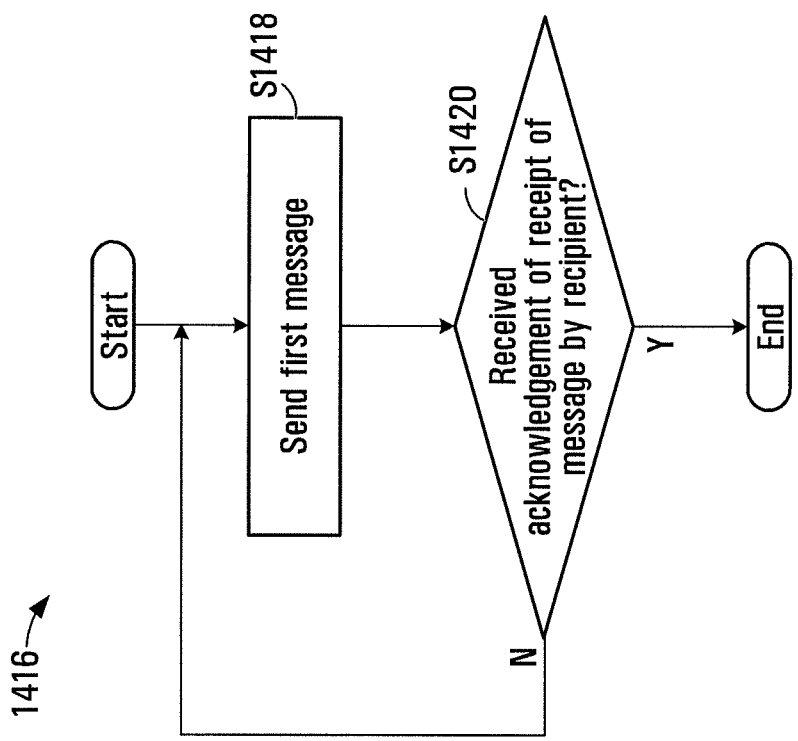

Operation of the exemplary embodiment from the server 14 perspective will now be described in conjunction with FIGS. 13A-C.

Flow diagram 1400 (FIG. 13A) depicts the simplest case in which server 14 sends a redundantly coded message (e.g. CALL_DISCONNECTED (FIG. 9, row 1034) or SECOND_CALL_DISCONNECTED (FIG. 9, row 1036)) to mobile device 11 (S1402). Receipt of the message by mobile device 11 may be assumed. Moreover, even if a transmission error occurs resulting in mobile device 11 receiving only a sub-sequence of the tones sent by server 14, conveniently, mobile device 11 may still identify the intended message in the manner previously discussed.

Flow diagram 1406 (FIG. 13B) depicts operation of server 14 upon receipt of a NACK message (FIG. 10, row 1104) from a mobile device 11 which it serves. Upon receipt of a NACK message (S1410), server 14 may determine if it sent a message to the mobile device 11 which sent the NACK message in a past window of time (S1412) (e.g. past 1 minute—of course, windows of time other than 1 minute could be employed): If it has, server 14 may resend the message (S1414) (because, for example, the DTMF tones may have been corrupted in transmission in such a way that mobile device 11 was unable to identify a candidate message in the manner previously described).

Flow diagram 1416 (FIG. 13C) depicts operation of server 14 to send a server message to mobile device 11 that requires an acknowledgement of receipt, such as exemplary TARGET_ANSWERED message (FIG. 9, row 1006). Specifically, server 14 may send the TARGET_ANSWERED message to mobile device (S1418). It may subsequently check whether it has received an ACK message (FIG. 10 row 1102) from mobile device 11 (S1420). If an ACK message is received from mobile device 11, acknowledging receipt of the TARGET_ANSWERED message, operation may end. However, if no ACK message has been received, server 14 may re-send the TARGET_ANSWERED message until it receives an ACK from mobile device 11.

Figure 14:
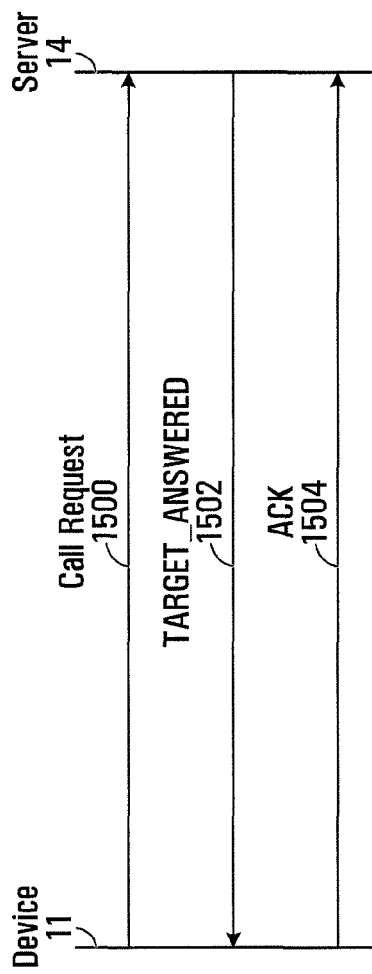
FIG. 14 is a signaling diagram generally indicating how a mobile acknowledges a message over a voice channel from the server in the enterprise communications platform.
Figure 15:
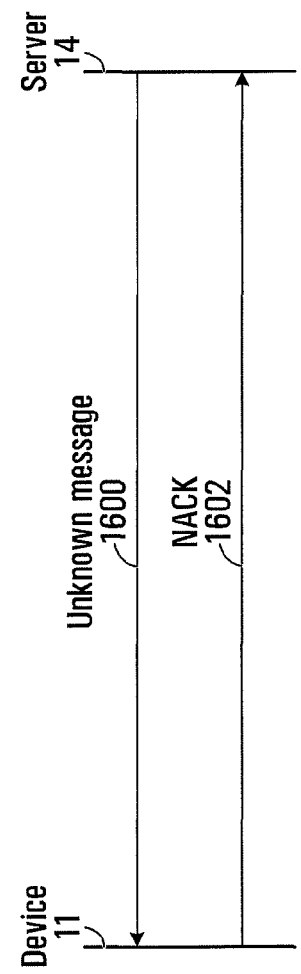
FIG. 15 is a signaling diagram generally indicating how a mobile indicates receipt of an unknown message to the server over a voice channel in the enterprise communications platform.

Exemplary interactions between server 14 and a mobile device 11, in accordance with the present disclosure are provided in FIGS. 14 and 15. Specifically, FIG. 14 is a signal diagram showing a call request from mobile device 11 to server 14 (block 1500). The call request may be of the form described in FIG. 6A and may, in particular, include the telephone number of the target (i.e. called) party (not shown). Server 14 (specifically, SMP 18 in conjunction with PBX 16—FIG. 6A/6B) may set up the connection with the target party in the manner previously described. Upon receiving an indication that the called party has answered (e.g. Target Phone Answers block 114 or Answers block 136—FIG. 6A/6B), server 14 may send a TARGET_ANSWERED message to mobile device 11 (block 1502). Mobile device 11 may determine that the TARGET_ANSWERED message must be acknowledged, and may, accordingly, send an ACK message back to server 14 (block 1504).

When mobile device 11 receives an unknown message (FIG. 15, block 1600), it may send a NACK message to server 14 (block 1602), thus prompting server 14 to check whether it had sent a message to mobile device 11 in a past window of time, and to re-send the message, if required.

Thus, as may now be appreciated, by implementing a message exchange protocol between server 14 and mobile devices 11 using DTMF signaling over the voice channel, server 14 and mobile devices 11 may communicate even when the data channel is unavailable. To account for the fact that DTMF signaling over the voice channel can be unreliable, "acknowledge" and "negative acknowledgement" mechanisms have been introduced into system 10. Additionally, error correction algorithms, such as the contextual error correction and redundant coding, may be used to correct some transmission errors, thereby reducing the number of instances requiring re-transmission of messages.

While not described in detail, it will be understood that the disclosed methods, exemplary message exchange protocol and components thereof (e.g. the message tables) may be implemented in software using programming languages such as JAVA, C++, etc., or in a combination of hardware and software. More specifically, computer readable medium 13 and computer readable medium 41 may store executable instructions which when executed by a processor (not shown) of mobile device 11 or server 14, respectively, cause mobile device 11 and server 14 to perform the disclosed methods.

Furthermore, it may be understood that message tables 900, 1000 and 1100 need not necessarily be stored as separate tables, nor in the locations described above. For example, in an another embodiment, message tables 900, 1000 and 1100 may be combined into one table and stored in a location accessible to server 14 and mobile devices 14 over one or a combination of PSTN 40, WAN 30 and PLMN 50. Moreover, the message table(s) may be stored in the form of a flat file, or in a conventional database which may be queried by server 14 and mobile devices 14.

Even further, redundant codes may be selected so that application of certain conventional error correction algorithms known to those of ordinary skill in the art may be applied.

Certain other adaptations and modifications of the described embodiments can be made. Therefore, the above discussed embodiments are considered to be illustrative and not restrictive.

What is claimed is:

1. At a mobile communications device server, a method of communicating with a mobile communications device served by said server, said method comprising:
   upon receipt of an indicator indicating receipt by said mobile communications device of an unrecognized message:
      determining if a first message was sent to said mobile communications device in a previous pre-determined window of time; and
      re-sending said first message if said determining determines that said first message was sent to said mobile communications device in said previous pre-determined window of time;
   sending a second message to said mobile communications device, said second message encoded by a particular unique sequence of DTMF tones wherein no sub-sequence of said particular unique sequence matches sequences or sub-sequences of tones encoding any other possible message such that said mobile communications device is able to identify said second message even if only a sub-sequence of said particular unique sequence is received; and
   sending a third message to said mobile communications device, said third message encoded by a further particular sequence of DTMF tones wherein one or more sub-sequences of said further articular unique sequence matches sequences or sub-sequences of tones encoding at least one other possible message but said third message is only sent after a sub-set of earlier messages such that said mobile communications device is able to identify said third message in context of earlier messages received.

2. The method of claim 1 further comprising:
   repeatedly sending a second further message until an indicator indicating receipt of said further message by said mobile communications device is received by said server, said indicator comprising a sequence of at least one DTMF tone.

3. The method of claim 2 wherein said further message is encoded by a sequence of at least one DTMF tone and wherein said indicator comprising a sequence of at least one DTMF tone is mapped to an acknowledge message.

4. The method of claim 1 wherein said receipt of an indicator indicating receipt by said mobile communications device of an unrecognized message comprises receiving a DTMF tone mapped to a negative acknowledgement message.

5. A mobile communications device server operable to execute the method of claim 1.

6. A computer-readable medium comprising computer executable instructions which when executed by a processor of a mobile communications device server cause said server to execute the method of claim 1.

7. At a mobile communications device server, a method of communicating with a mobile communications device served by said server, said method comprising:

sending a first message to said mobile communications device, said first message encoded by a first particular unique sequence of DTMF tones wherein no sub-sequence of said first particular unique sequence matches sequences or sub-sequences of tones encoding any other possible message such that said mobile communications device is able to identify said first message even if only a sub-sequence of said first particular unique sequence is received; and sending a second message to said mobile communications device, said second message encoded by a second particular sequence of DTMF tones wherein one or more sub-sequences of said second particular unique sequence matches sequences or sub-sequences of tones encoding at least one other possible message but said second message is only sent after a sub-set of earlier messages such that said mobile communications device is able to identify said second message in context of earlier messages received.

8. The method of claim 7 further comprising:

upon receipt of an indicator indicating receipt by said mobile communications device of an unrecognized message:

determining if a given message was sent to said mobile communications device in a previous pre-determined window of time; and re-sending said given message if said determining determines that said given message was sent to said mobile communications device in said previous pre-determined window of time.

9. The method of claim 8 further comprising:

repeatedly sending a third message until an indicator indicating receipt of said third message by said mobile communications device is received by said server, said indicator comprising a sequence of at least one DTMF tone.

10. The method of claim 9 wherein said third message is encoded by a sequence of at least one DTMF tone and wherein said indicator comprising a sequence of at least one DTMF tone is mapped to an acknowledge message.

11. The method of claim 9 wherein said receipt of an indicator indicating receipt by said mobile communications device of an unrecognized message comprises receiving a DTMF tone mapped to a negative acknowledgement message.

12. A mobile communications device server operable to execute the method of claim 7.

13. A computer-readable medium comprising computer executable instructions which when executed by a processor of a mobile communications device server cause said server to execute the method of claim 7.

\* \* \* \* \*